Aug. 24, 1948.  C. F. BOCKMAN ET AL  2,447,682
CHUCK
Filed Jan. 30, 1946  2 Sheets-Sheet 1
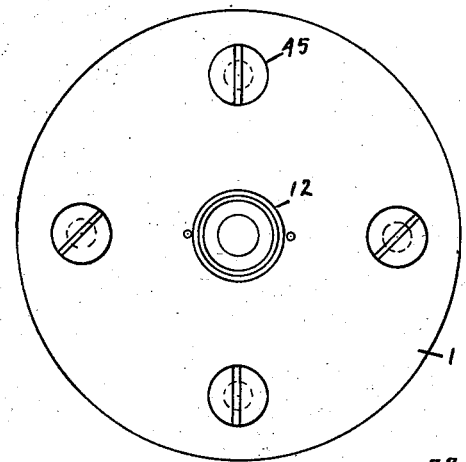
FIG. 1
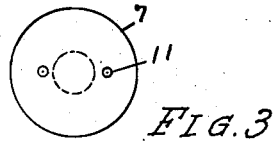
FIG. 3
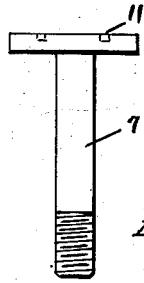
FIG. 4
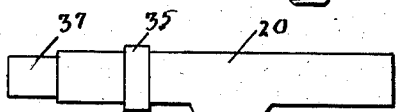
FIG. 5
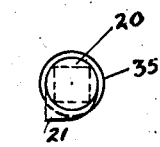
FIG. 6
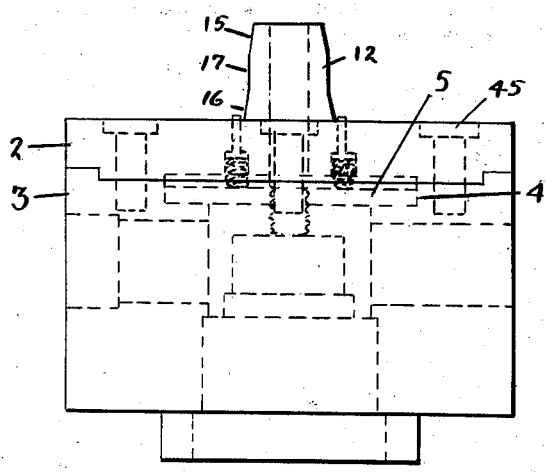
FIG. 2
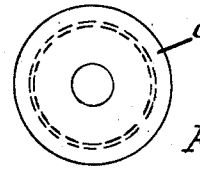
FIG. 7
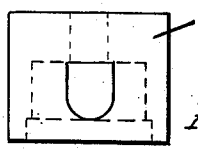
FIG. 8
FIG. 9
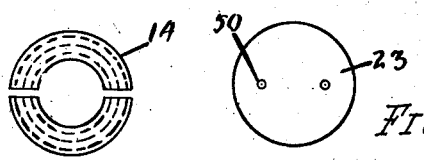
FIG. 10
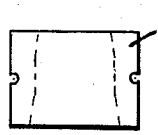
FIG. 12
FIG. 11
INVENTOR.
CARL F. BOCKMAN.
RICHARD LUTTICH.
BY Gordon C. Mack Patented Aug. 24, 1948

2,447,682

UNITED STATES PATENT OFFICE 2,447,682

CHUCK

Carl F. Bockman and Richard Luttich, East Akron, Ohio

Application January 30, 1946, Serial No. 644,386

10 Claims. (Cl. 279—51)

This invention relates to a new chuck body assembly. More particularly, it relates to an expanding bushing or the like on the face of the chuck which is readily expanded and contracted by means located within the chuck so as to radially grip and release gears and other articles having cylindrical openings and the like therein which are to be worked upon the chuck.

For instance, if a gear with a central bore is to be worked upon, the gear is placed flush against the face of the chuck with the bore over the expanding bushing. Then, by simply turning a key or the like, the bushing is expanded and firmly grips the gear and holds it against the face of the chuck without the least dislodgment while the surface of the gear is turned or the teeth are cut or any desired operation is performed upon the gear. When the job is completed, the key is turned in the opposite direction, and the gear is immediately released.

The chuck assembly of this invention will be further explained with reference to the accompanying drawings, in which:

Fig. 1 is an end view of the chuck assembly with the expanding bushing removed;

Fig. 2 is a section on the line 1—1 of Fig. 1 (the means for expanding and contracting the bushing being omitted);

Figs. 3 and 4 are an end view and elevation, respectively, of the drawbolt used in expanding and contracting the bushing (the use of the drawbolt and other parts shown in Figs. 3–12 being illustrated in Figs. 13 and 14);

Figs. 5 and 6 are a side view and end view, respectively, of the lock pin;

Figs. 7 and 8 are a plan view and section, respectively, through the lock nut;

Figs. 9 and 10 are an elevation and plan view, respectively, of the threaded closure for the lock nut;

Figure 13:
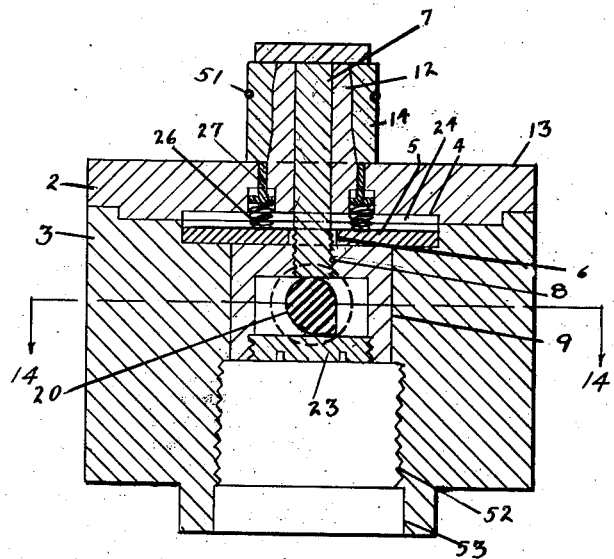
Figure 14:
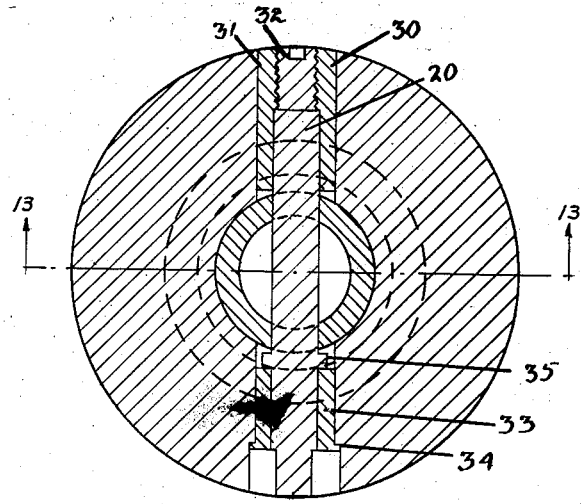

Figs. 11 and 12 are a side view and plan view, respectively, of the split bushing; and Figs. 13 and 14 are sections on the lines 13—13 of Fig. 14 and 14—14 of Fig. 13, respectively, showing the assembled chuck head with the expanding split bushing in place in Fig. 13.

In the drawings the chuck head 1 is divided into an upper part 2 and lower part 3 which provide between them the cylindrical opening 4 in which the knockout plate 5 is located. This knockout plate is provided with the central opening 6 to receive the drawbolt 7, which is threaded at 8 into the lock nut 9 so that the drawbolt moves with the lock nut. The head of the drawbolt 7 is provided with two small openings 11 for the insertion of a suitable tool for threading the drawbolt in and out of the lock nut 9. The lock nut passes longitudinally through an opening in the head 12 which projects from the working surface 13 of the chuck. The outer surface of the head is tapered so that as the split bushing 14 is pushed down over it toward the surface of the chuck 13, it expands. Instead of a single taper, the preferred form of the invention illustrated in the drawing shows a divided taper 15, 16 with a vertical wall 17 between the two tapered portions.

The movement of the drawbolt 7 and lock nut 9 (which pull the split bushing 14 over the head 12 and spread it and which also permit this split bushing to be moved back over the head and contract) is controlled by the lock pin 20.

The side and end views in Figs. 5 and 6 show the enlarged portion 21 of the lock pin 20 near its center. When turned down against the closure 23, this enlargement 21 causes the lock nut 9 to be lowered in the chuck head. This draws the drawbolt 7 into the chuck head, pulls the split bushing 14 down over the head 12 and expands it, and forms the space 24 between the knockout plate 5 and the upper portion of the chuck head. When the pressure of the enlargement 21 against the closure 23 is released, the lock nut 9 tends to move outwardly and take with it the knockout plate 5. This causes pressure against the springs 26 which lift the knockout pins 27 which, in turn, lift the split bushing 14 off the head 12. The bushing lifts the workpiece with it, but since the bushing contracts as it is lifted, it releases the workpiece.

The assembly of the locking device is best shown in Fig. 14. The rear bushing 30 is first put in place in the opening 31 through the center of the chuck. The end set screw 32 is then put in place. The lock pin 20 is then inserted from the other end of the opening 31, through the U-shaped opening of the lock nut 9 shown in Fig. 8. The enlargement 21 on the pin is at the top of the U opening when the pin is inserted and is then turned to the desired position. The lock pin is placed flush against the set screw 32. The front bushing 33 is then forced into the opening 31 until the enlargement at the outer end rests on the shoulder 34. The collar 35 prevents the lock pin from slipping out through the opening in this bushing 33. The squared end 37 of the lock pin provides means for turning the pin with a suitable key. By means of the key, the enlargement 21 (Fig. 5) may be turned down as shown in Figs. 13 and 14 to force the lock nut away from the surface of the chuck or to turn the enlargement 21 to the side of the pin.

Both of the openings in the lock nut 9 through which the pin 20 passes are U-shaped to form a cradle to support the pin and yet provide for insertion and removal of the enlargement 21; or, if preferred, only the opening toward the square head 37 is U-shaped, and the opposite opening which receives the shank of the pin is circular, as indicated in Fig. 13.

The knocking pins 27 are provided in the usual way with enlarged heads and springs 26. These springs, by pressing against the knockout plate 5, force the outer ends of the pins 27 from the face of the chuck. The bushing 14 fits against these pins. When the bushing is pulled down over the head 12, the pins are pressed flush with the surface 13 of the chuck against the pressure of the spring 26. When the pressure on the drawbolt 7 is relieved so that the bushing is free to be moved off the head, the springs 26 lift the bushing 14 up off the head. They are aided in this by the movement of the knockout plate 5. The bushing contracts as it is lifted off the head, and it thus releases its grip on the gear or other object which has been held on the chuck.

Different sized heads 12 are required for different sized workpieces. The upper part 2 of the chuck head may be replaced by a similar part with a different sized head. This part 2 is held in place by the bolts 45. Larger heads require that the knockout pins be placed farther from the axis of the chuck head than smaller ones, such as that illustrated. For this reason the knockout plate 5 is made large enough to reach out under the springs of the knockout pins, wherever they may be located.

To assemble the chuck, the knockout pins are placed in their openings in the top portion 2 of the chuck head. The knockout plate 5 is placed over these in the countersunk portion of the opening 4 which is contained in the part 2 of the chuckhead. The part 3 of the chuck head is then put in place over the knockout plate 5. The two parts of the chuck head are bolted together by the bolts 45. The bushing 30 and set screw 32 are then put in place. The lock nut 9 is put in place with the openings in line with the opening 31 in the chuck head. The lock pin 20 is inserted, and the bushing 33 is put in place. The split bushing 14 is then put over the head 12, and the drawbolt 7 is threaded into the lock nut 9.

The closure 23 may be threaded into the bottom of the lock nut at any convenient stage of the assembly procedure. The small openings 50 are provided to facilitate insertion and removal of the closure in the end of the lock nut.

To operate, a suitable key is fitted over the head 37 of the lock pin, and the lock pin is turned so that the enlargement 21 is at the side of the pin. This makes the lock nut 9 free to move up and down, and the drawbolt 7 moves with it. A gear or other article to be worked upon is then easily placed over the contracted bushing 14 and flush against the surface 13 of the chuck. Then with the key, the lock pin is turned through an angle of about 45° to 90° to force the enlargement 21 of the pin against the closure 23 and thus force the lock nut 9 away from the surface of the chuck and draw the split bushing 14 down over the head 12. This causes the bushing, provided with the usual coil spring 51, to expand against the walls of the opening in the gear or other article being worked upon. The spring 51 contracts the bushing and holds the article on the head 12 while any desired operation is performed upon it. The article is usually held flush against the surface 13, but shims or the like may be used if for any reason they are deemed desirable.

The chuck is threaded at 52 and provided with the collar 53, as usual.

Various modifications may be made in the design without departing from the scope of the appended claims. For example, the knockout plate may be omitted, in which case the springs 26 of the knockout pins 27 will operate directly against the surface of the lock nut 9. In this type of construction it is not necessary to divide the chuck head into two parts. Other modifications will suggest themselves to those skilled in the art. Generally, it will be desirable to make the chuck head as thin as possible to support the workpiece as near to the base of the chuck head as is feasible.

What we claim is:

1. A chuck, a protrusion on the face thereof which is symmetric about the axis of the chuck, the cross section of which protrusion is greater toward the base thereof than away from the base, a lock nut within the chuck, a split bushing around the protrusion, a lock pin within the lock nut with an eccentric adapted to move the lock nut away from the face of the chuck as the eccentric is pressed against its bottom, means connecting the lock nut with the bushing whereby as the lock pin forces the lock nut away from the face of the chuck, said connecting means pulls the bushing toward the face of the chuck over the protrusion.

2. A chuck with expansible means extending from the face thereof adapted to firmly hold to its periphery an article to be worked upon the chuck, a lock pin passing radially through the chuck, a lock nut through which the lock pin passes, means operatively connecting the lock nut and said expansible means so as to alter the position of the latter, and an eccentric on the lock pin adapted to press on the lock nut as the lock pin is rotated and to change the relative position of the lock pin and lock nut.

3. A chuck, a lock nut therein, means connected with the lock nut and passing axially through the chuck and extending from the operative face thereof in operative contact with expansible means thereon, a passageway through the lock nut in register with an opening passing radially through the chuck, a stop at one end of said opening, a lock pin in said opening and passing through said lock nut and abutting against said stop, a key head at the other end of the lock pin and available through the opening, and means on the lock pin for pressure contact with the lock nut to change the relative position of the lock pin and lock nut when said expansible means is to be expanded.

4. A chuck divided into a lower and upper part, means for holding the parts together, an outwardly tapering head protruding from the outer surface of the upper part, holes for knockout pins adjacent the base of the tapering head, knockout pins therein, a knockout plate between the two halves with springs under the knockout pins pressing against knockout plate, an expanding bushing around the tapering head, a lock nut in the lower part, means for moving the same toward and away from the upper part, and means connecting the same with the bushing to draw the bushing over the tapered head as the lock nut is moved away from the upper part.

5. A chuck, a protrusion on the face thereof which is symmetric about the axis of the chuck, the cross section of which protrusion is greater toward the base thereof than away from the base, and around the protrusion a split bushing formed of only two parts whose periphery is adapted, on expansion, to hold an article to be worked on by the chuck.

6. A chuck with expansible means extending from the face thereof adapted to firmly hold to its periphery an article to be worked upon the chuck, a lockpin passing radially through the chuck, a locknut through which the lockpin passes, means operatively connecting the locknut and said expansible means so as to expand and contract the latter, and an eccentric on the lockpin adapted to press on the locknut which eccentric permits the lockpin to be turned in only one direction in pressing on the locknut and which eccentric is incapable of a complete revolution within the locknut.

7. A chuck with expansible means extending from the face thereof adapted to firmly hold to its periphery an article to be worked upon the chuck, a lockpin passing radially through the chuck, a locknut through which the lockpin passes, means operatively connecting the locknut and said expansible means so as to expand and contract the latter, and an eccentric on the lockpin adapted to press on the locknut to effect relative movement between the lockpin and locknut to expand said expansible means, the surface of the locknut on which the eccentric is adapted to press being replaceable.

8. A chuck with expansible means extending from the face thereof adapted to firmly hold to its periphery an article to be worked upon the chuck, a lockpin passing radially through the chuck, a locknut through which the lockpin passes and which is adapted to be moved by an eccentric on the lockpin and which is operatively connected with said expansible means to expand and contract the same, the lockpin on both sides of said eccentric being held in replaceable bushings held in the chuck.

9. A chuck divided into a lower and upper part, means for holding the parts together, an outwardly tapering head protruding from the outer face of the upper part, holes for knockout pins adjacent the base of the tapering head, knockout pins therein, a knockout plate between the two halves with springs under the knockout pins pressing against the knockout plate, an expansible two-part bushing around the tapering head, a locknut in the lower part, means connecting the same with the tapering head, a lockpin passing radially through the chuck with an eccentric thereon which is adapted to press on the locknut to move it, the portion of the locknut whose surface is pressed by the eccentric being removable, and replaceable bushings in the chuck which embrace the lockpin on each side of the eccentric.

10. A chuck, a protrusion on the face thereof which is symmetric about the axis of the chuck, an expansible split bushing adapted to fit over the protrusion, and knockout pins in the face of the chuck around the protrusion and adapted to contact the bottom surface of the bushing as it is expanded over the protrusion.

CARL F. BOCKMAN.
RICHARD LUTTICH.

REFERENCES CITED

The following references are of record in the file of this patent:

UNITED STATES PATENTS

| Number | Name | Date |
|---|---|---|
| 1,414,460 | Dixon | May 2, 1922 |
| 2,360,908 | Stoner | Oct. 24, 1944 |

FOREIGN PATENTS

| Number | Country | Date |
|---|---|---|
| 361,917 | Germany | Oct. 20, 1922 |
| 309,858 | Great Britain | Feb. 23, 1929 |
| 361,917 | Germany | |
| 512,178 | France | Jan. 17, 1921 |

OTHER REFERENCES

American Machinist, page 772, vol. 58, No. 21, 279; Gear Chucks, May 24, 1923, (Copy in Division 52.)

Certificate of Correction

August 24, 1948.

Patent No. 2,447,682.

CARL F. BOCKMAN ET AL.

It is hereby certified that errors appear in the printed specification of the above numbered patent requiring correction as follows: Column 3, line 12, for "knocking" read *knockout*; column 4, line 71, after the word "against" insert *the*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*